United States Patent Office 3,284,378
Patented Nov. 8, 1966

3,284,378
FLAME RESISTANT PLASTIC COMPOSITION
George G. Roberts, 447 Eleanor Drive, Woodside, Calif., and Henry Nakagawa, 907 E. 5th Ave., San Mateo, Calif.
No Drawing. Filed Mar. 16, 1964, Ser. No. 352,333
7 Claims. (Cl. 260—9)

This invention relates to a new composition of matter, namely, a thermosetting material which is fire resistant and flame resistant and is suitable for use in electrical fixtures, especially marine electrical fixtures, including socket holders, sockets, switches, shades, plugs, receptacles, junction boxes, lighting panels and boards, brackets, reflectors, swimming pool light fixtures and the like. The material may also be used as handles for hand or portable tools, for doors, door frames, window frames, tile, flooring, furniture, railings, ladders, acoustical ceilings, inside and outside wall bulkhead panels, and panels for paint lockers, engine rooms, and other areas that are to be kept fireproof.

Various plastic materials which might otherwise be considered suitable for use in marine electrical fixtures and other similar uses have not heretofore been suitable because of their inability to resist flames. Many of these plastics burn freely, others of them burn slowly, and heretofore, the only suitable plastics which did not burn were quite expensive. Moreover, the plastic materials which were fire resistant were not usually strong enough; they tended to be rather brittle and to break easily, and it has been necessary to incorporate into them a body of non-inflammable fibers, such as glass fibers or the like to provide a fibrous skeleton network which helps to resist breakage. Such skeleton materials have been expensive, as have their incorporation, and they have tended to make the ultimate cost quite high.

An object of the present invention is to provide a fire-resisting thermosetting plastic composition of sufficient strength, fire-resistance, and flame-resistance for satisfactory use in various electrical fixtures and panels for fireproofing, and the like.

Another object of the invention is to provide a relatively inexpensive fire-resistant thermosetting composition capable of use in electrical fixtures.

Another object of the invention is to provide an inexpensive material for electrical fixtures which is also strong enough to withstand the vibration and pounding that occur when a ship is crossing the ocean. Heretofore, only corrosion-resistant metal has been acceptable for such uses.

Other objects and advantages of the invention will appear from the following description.

We have found that a combination of polyester resins, inert mineral fillers, conventional fire retarding agents, and chopped vegetable fibers, such as sisal, and the like provide both the needed strength and the needed resistance to flame and fire. Thus, speaking broadly, my invention comprises (1) 40% to 55% of a polyester resin, (2) 25% to 40% of an inert filler of clay, asbestos, or other mineral type, (3) 10% to 20% of sisal or like fiber chopped in lengths which enable direct mixing with the resin and filler while providing a strength-imparting fibrous skeleton that helps impart impact-resistance and vibration resistance to the plastic, and (4) 5% to 10% of a fire retardant. Pigments and other materials may be incorporated if desired.

Any polyester resin may be used such as the alkyd resins made from dicarboxylic acids. Among the suitable dicarboxylic acids are iso-phthalic acid (or phthalic anhydride), maleic acid (or anhydride), adipic acid and fumaric acid. These acids are reacted with dihydric (dihydroxy) alcohol such as glycerin, and are polymerized. The alkyd may be styrenated by polymerization of styrene monomer, but this tends to make it less flame resistant. The filler may be a mixture of clay and asbestos.

Various flame retardants may be used, including antimony trioxile, tricresyl phosphate, some alkyl aryl phosphates, triphenyl phosphite, and certain chlorine-barium compounds.

The preferred vegetable fiber is sisal chopped to an average length of about one inch.

For example, a polyester resin was prepared employing approximately 47% of a phthalic or isophthalic and glycerin polyester resin, 10½% sisal fibers chopped to about one inch long, about 33% of inert clay-asbestos filler, and 7¼% of antimony trioxide. Pigment, accelerator, and other curing and inert materials made up the 2¼% balance. After thorough mixing and dispersal, the material was molded into three wedge-shaped test pieces, each measuring approximately 2″ x 4″ x ¼″. The test flame of a Bunsen burner was adjusted to produce a blue cone height of 1½ inches with an outer flame height of approxiamtely 5 inches. Each test piece was in turn subjected to the flame of the Bunsen burner for five successive periods of 15 seconds each, with a waiting period of 15 seconds following the moment when the flame extinguished itself. The relative position of the test flame and the sample were such that the tip of the inner cone touched the end of the sample. During each test, measurements were made of the height of the flame and the duration of the flame. The results are tabulated in the following table.

| Application No. | Sample 1 Flame Dur. | | Sample 2 Flame Dur. | | Sample 3 Flame Dur. | |
|---|---|---|---|---|---|---|
| | Ht. In. | Sec. | Ht. In. | Sec. | Ht. In. | Sec. |
| 1 | 0 | 0 | 0 | 0 | 0 | 0 |
| 2 | 0 | 0 | 0 | 0 | 0 | 0 |
| 3 | ¾ | 1 | 0 | 0 | 0 | 1 |
| 4 | 0 | 0 | 1 | 1 | 1 | 1 |
| 5 | 1 | 1 | 1 | 1 | 1 | 1 |

Thus, it will be seen that the material, although loaded with vegetable fibers, did not go into flames and did successfully resist flames to a remarkable extent.

Socket holders, lamp shades, and plugs have been made from this material and have been found to be not only flame resistant but strong and resistant to impact and vibration, and on tests it absorbed only 0.367% of its weight of water after a 24-hour soak.

We claim:
1. A flame-resistant self extinguishable plastic having corrosion resistance, consisting essentially of
    (a) 40% to 55% of polyester resin condensation product of dicarboxylic acids with dihydroxy alcohols,
    (b) 25% to 40% of inert mineral filler, namely, a mixture of clay and asbestos,
    (c) 10% to 20% of chopped sisal fiber, and
    (d) 5% to 10% of fire retardant.
2. The plastic of claim 1 wherein said sisal fibers are about one inch long.
3. The plastic of claim 1 wherein said dicarboxylic acid is chosen from the group consisting of the phthalic, maleic, adipic, and fumaric acids.
4. The plastic of claim 1 wherein said resin is styrenated.

5. The plastic of claim 1 wherein said fire retardant composition is chosen from the group consisting of antimony trioxide, tricresyl phosphate, and triphenyl phosphite.

6. A flame-resistant, corrosion-resistant, self-extinguishing plastic consisting essentially of
   about 47% of glyceral phthalate resin,
   about 10% of chopped sisal fibers,
   about 33% of clay and asbestos filler,
   about 7% of antimony trioxide, and
   about 3% of curing, accelerating, and inert materials.

7. The plastic of claim 6 wherein the sisal fibers are about one inch long.

References Cited by the Examiner
UNITED STATES PATENTS

| | | | |
|---|---|---|---|
| 2,514,141 | 7/1950 | Phillips | 260—40 |
| 2,773,044 | 12/1956 | Vesce | 260—22 |
| 3,112,283 | 11/1963 | Hansen et al. | 260—17.4 |

OTHER REFERENCES

Bjorksten Research Lab., Inc., Polyesters and Their Applications, Reinhold Pub. Corp., 1956, T.P. 986 P6 B5, pp. 11, 12, 73, 90, 92, 94–96 and 140.

WILLIAM H. SHORT, *Primary Examiner.*

E. M. WOODBERRY, *Assistant Examiner.*